United States Patent [19]

Braun et al.

[11] Patent Number: 5,894,714
[45] Date of Patent: Apr. 20, 1999

[54] BRAKE FOR SELF-PROPELLED VEHICLE

[75] Inventors: Stephen Alphonse Braun, Horicon, Wis.; Llewellyn Everett Williams, Hastings, Minn.

[73] Assignee: Deere & Company, Moline, Ill.

[21] Appl. No.: 08/848,042

[22] Filed: Apr. 28, 1997

[51] Int. Cl.⁶ .................... A01Q 75/02; A01Q 69/00
[52] U.S. Cl. .................................. 56/11.4; 56/11.3
[58] Field of Search ..................... 56/11.2, 11.5, 56/11.8, 11.4, 10.9, 11.1, 11.9, 11.3, DIG. 6; 180/6.48, 19.3, 19.1, 308, 333

[56] References Cited

U.S. PATENT DOCUMENTS

| | | | |
|---|---|---|---|
| 4,321,980 | 3/1982 | Nissen | 180/333 |
| 4,787,195 | 11/1988 | Wenzel | 56/11.1 |
| 4,920,733 | 5/1990 | Berrios | 56/10.9 |
| 4,967,543 | 11/1990 | Scag et al. | 56/10.8 |
| 5,131,483 | 7/1992 | Parkes | 180/6.48 |
| 5,146,735 | 9/1992 | McDonner | 56/11.3 |
| 5,197,577 | 3/1993 | Hayek | 56/11.3 X |
| 5,343,678 | 9/1994 | Stuart | 56/11.3 |
| 5,375,674 | 12/1994 | Peter | 180/19.3 |
| 5,415,059 | 5/1995 | Hein et al. | 56/11.3 X |
| 5,518,079 | 5/1996 | Zvolanek | 180/19.1 |
| 5,644,903 | 7/1997 | Davis | 56/10.8 |
| 5,651,241 | 7/1997 | Wegner | 56/11.2 |

*Primary Examiner*—Thomas B. Will
*Assistant Examiner*—Robert Pezzuto

[57] ABSTRACT

A self-propelled vehicle is provided with a main speed control lever and a brake for preventing rotation of drive wheels. When an operator places the main speed control lever in a stop position, the vehicle's transmission in shifted to a neutral or near-neutral position and the brake is engaged.

20 Claims, 8 Drawing Sheets

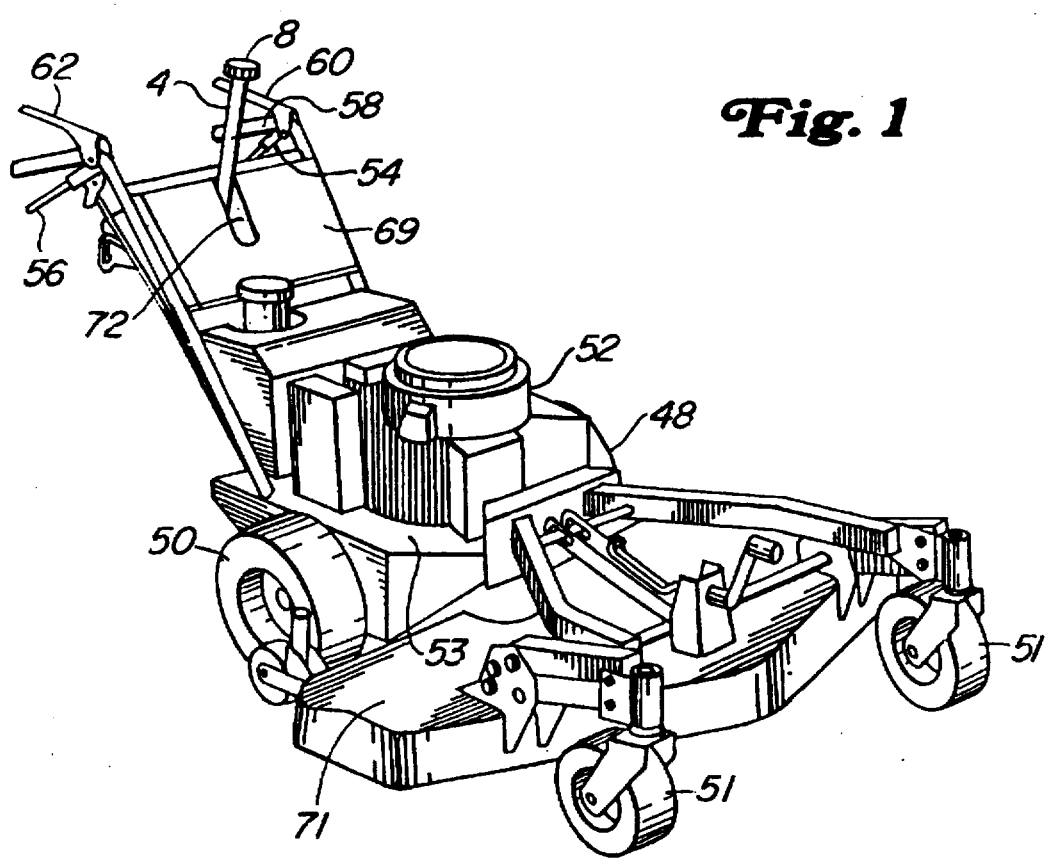

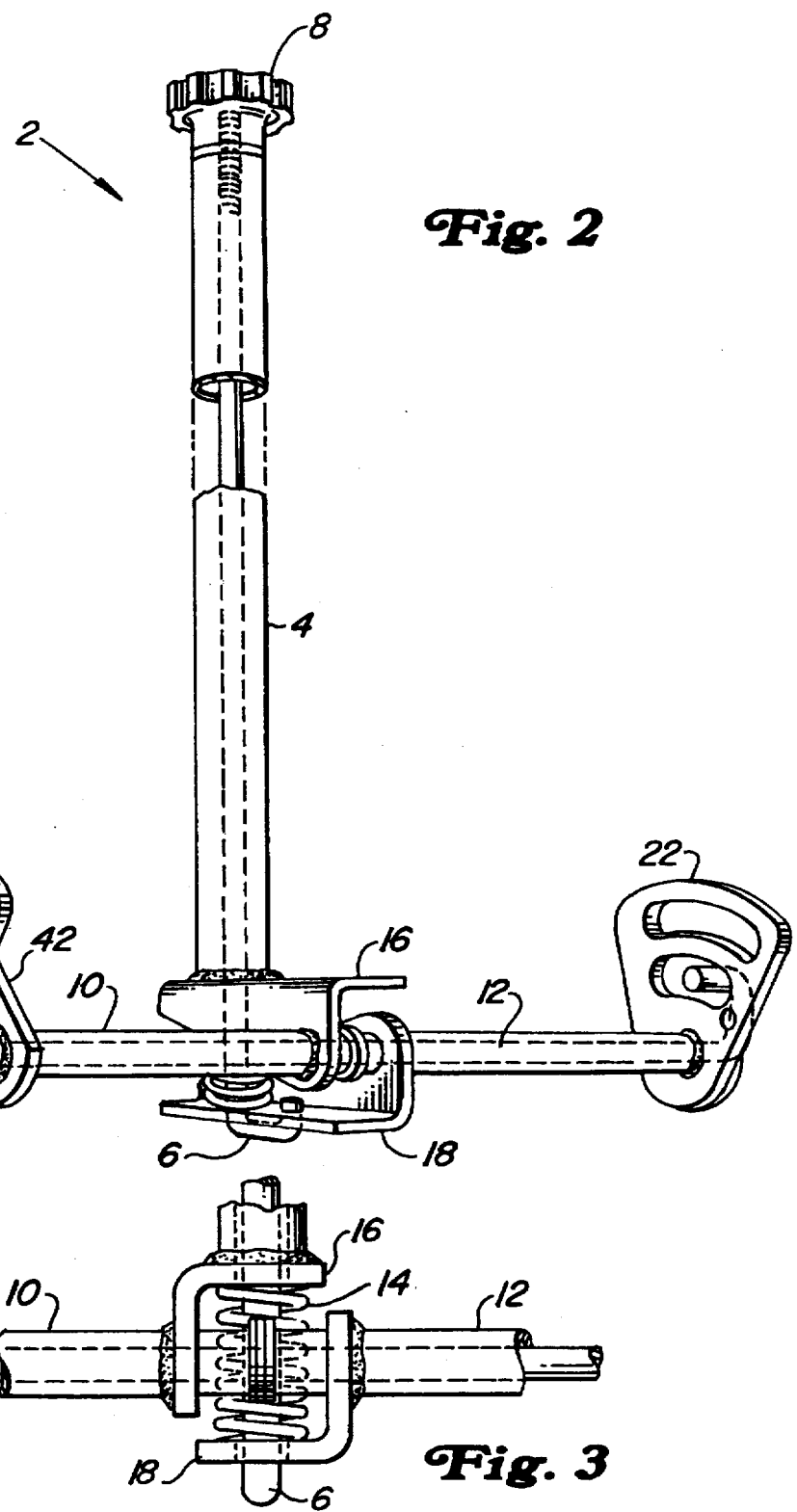

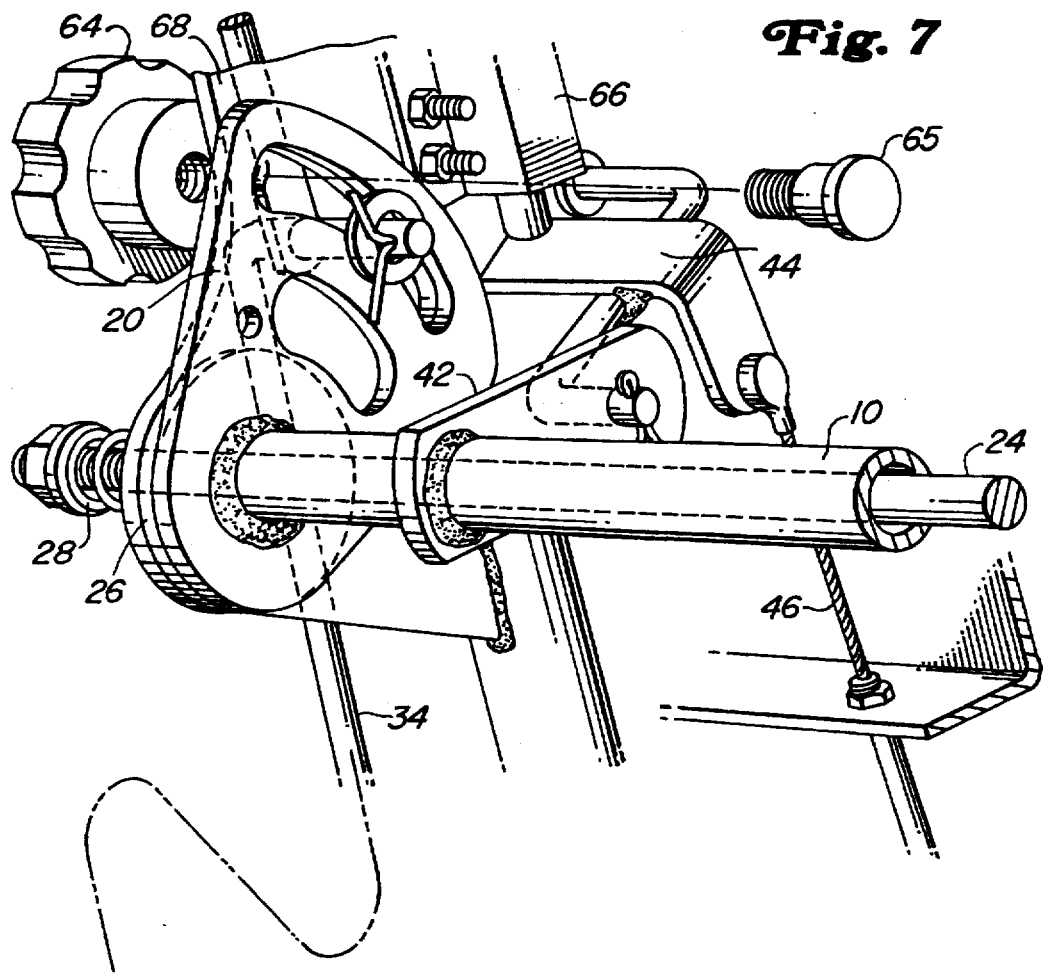
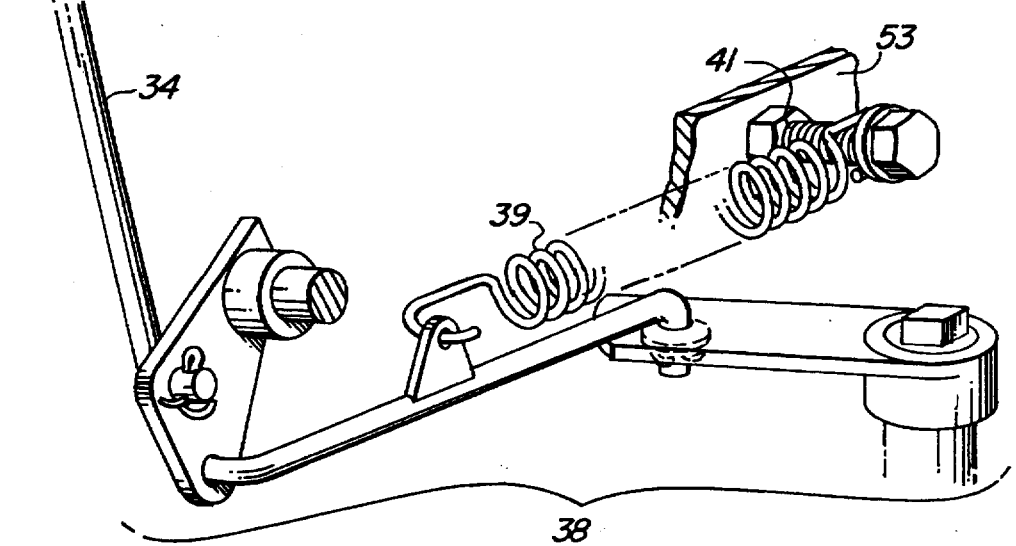
Fig. 7

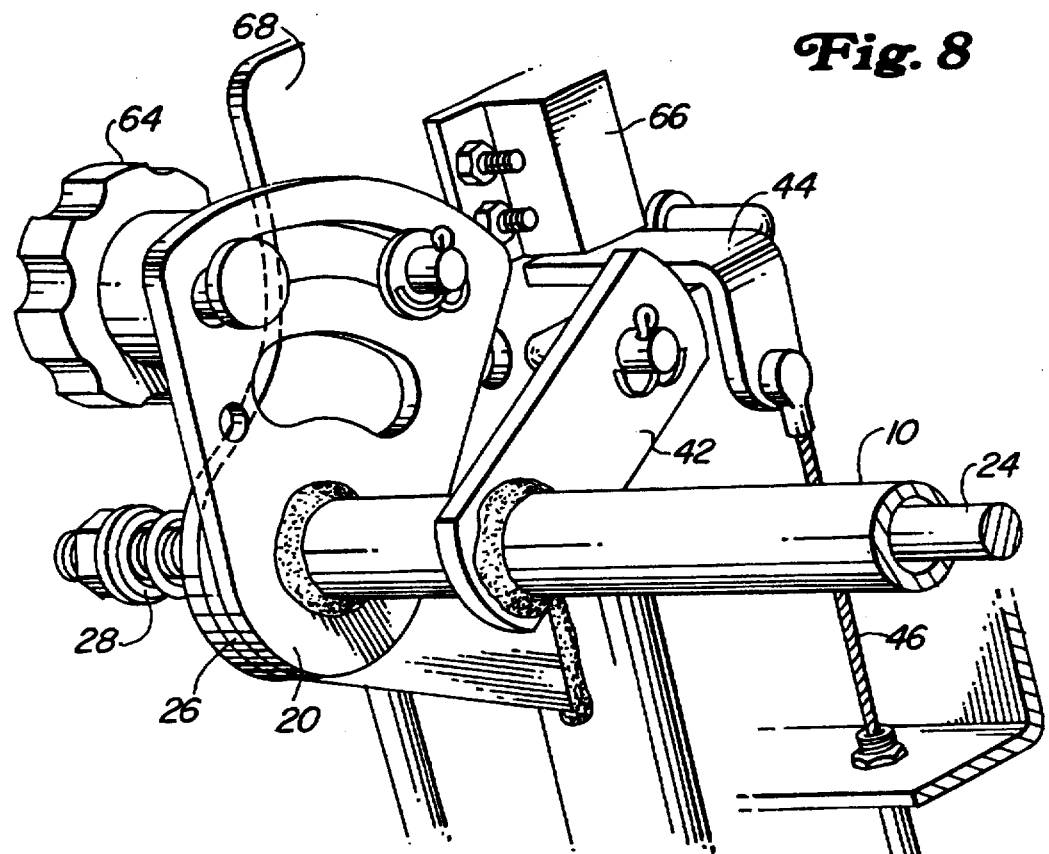
Fig. 8
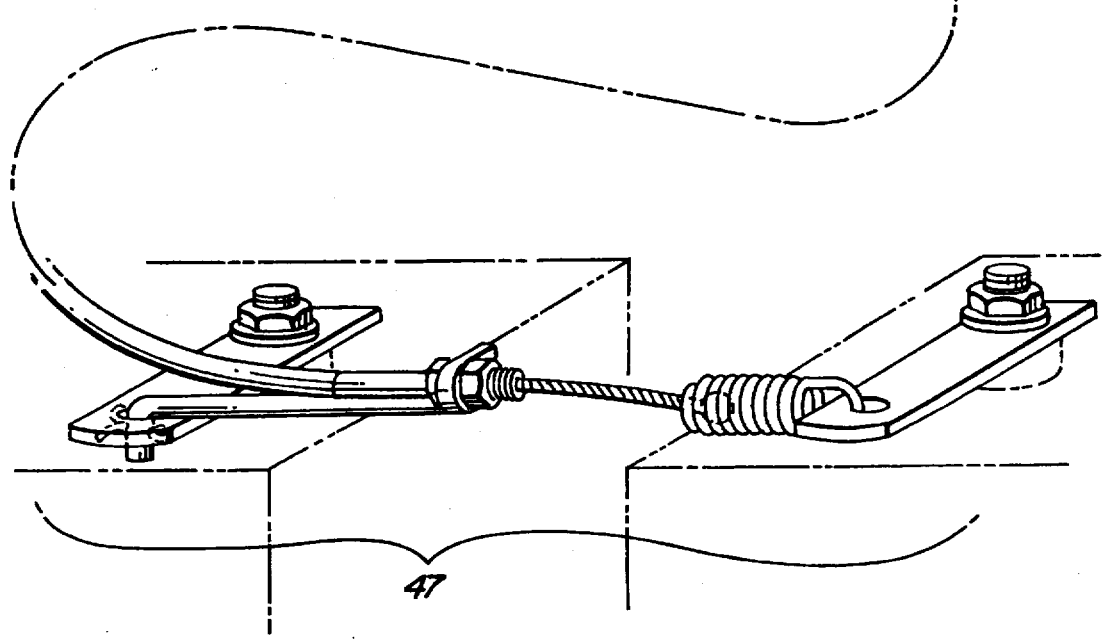

5,894,714

BRAKE FOR SELF-PROPELLED VEHICLE

BACKGROUND OF THE INVENTION

1. Field of the Invention

The present invention relates to brakes and, more particularly, to parking brakes for self-propelled, walk-behind vehicles. A preferred embodiment of the present invention relates to a brake incorporated with a main speed control lever in a self-propelled, walk-behind lawn mower having a hydrostatic transmission.

2. Description of Related Art

It is known to utilize a single stick system for controlling the maximum forward speed of left and right drive wheels simultaneously or a two-stick system for controlling the maximum forward speed of each driven wheel in a walk-behind mower, while separate hand levers are used to make adjustments to individual drive wheel speed in a range from the maximum speed set by the stick corresponding to each drive wheel through neutral to reverse.

It is also known to provide a parking brake in order to prevent unintended movement of a vehicle; however, in conventional self-propelled vehicles, a parking brake lever represents an additional control which must be manipulated by an operator when stopping and starting the mower.

In addition, many conventional walk-behind lawn mowers utilize a hydraulic system for transmitting power from the vehicle's engine to the mower's drive wheels. These systems generally include left and right drive wheels, each driven by a hydraulic motor. The rotational speed of left and right drive wheels are commonly controlled individually by levers actuated by an operator. These mowers are typically capable of a "zero turn radius" wherein either the left or right drive wheel is driven forward while the other is driven in reverse.

Due to manufacturing tolerances and changes in operating conditions, the neutral position at the operator control and the true neutral position of the hydraulic components do not coincide, resulting in a condition where the machine will creep and possibly move out of control. Some machines equipped with a parking brake do not require the drive control to be at or near neutral when applied, causing possible wear and overheating of hydraulic components.

It is therefore an object of the present invention to provide a brake feature for a main speed control lever in a self-propelled vehicle, which is applied simultaneously when the control is placed into a neutral (stop) position. It is a further object of the present invention to extend the life of components in a hydrostatically driven vehicle by providing a brake which is engaged only when the vehicle's transmission is in a neutral or near-neutral position.

SUMMARY OF THE INVENTION

The present invention provides a brake for a self propelled, walk behind vehicle, said brake engageable by a speed control lever for regulating maximum forward speed of the vehicle's drive wheels. Placement of the speed control lever in a stop position causes brakes to be applied at the vehicle's drive wheels, while the vehicle's transmission is placed in a neutral or near-neutral position. The speed control lever may also be connected to engine ignition by means of operator presence controls which stop the vehicle's engine if an operator leaves the operator station without placing the main speed control lever into its neutral and braked position.

An advantage of incorporating a brake into a speed control lever is the ease and speed with which the brake may be applied when the engine is running. For instance, if an operator needs to remove an object from the path of the mower, the operator can stop the movement of the machine without shutting down the engine.

BRIEF DESCRIPTION OF THE DRAWINGS

FIG. 1 is a perspective view of a self-propelled, walk-behind lawn mower according to the preferred embodiment of the present invention.

FIG. 2 is a perspective view of a wheel motor control mechanism according to the present invention.

FIG. 3 is an enlarged view of the arrangement of left and right adjustment plates of FIG. 2.

FIG. 7 is a perspective view of a left-hand portion of a control mechanism according to the present invention FIG. 8 is similar to FIG. 7 with the elements arranged generally as they would appear with the main speed control placed in its stop position.

DESCRIPTION OF PREFERRED EMBODIMENT

Figure 4:
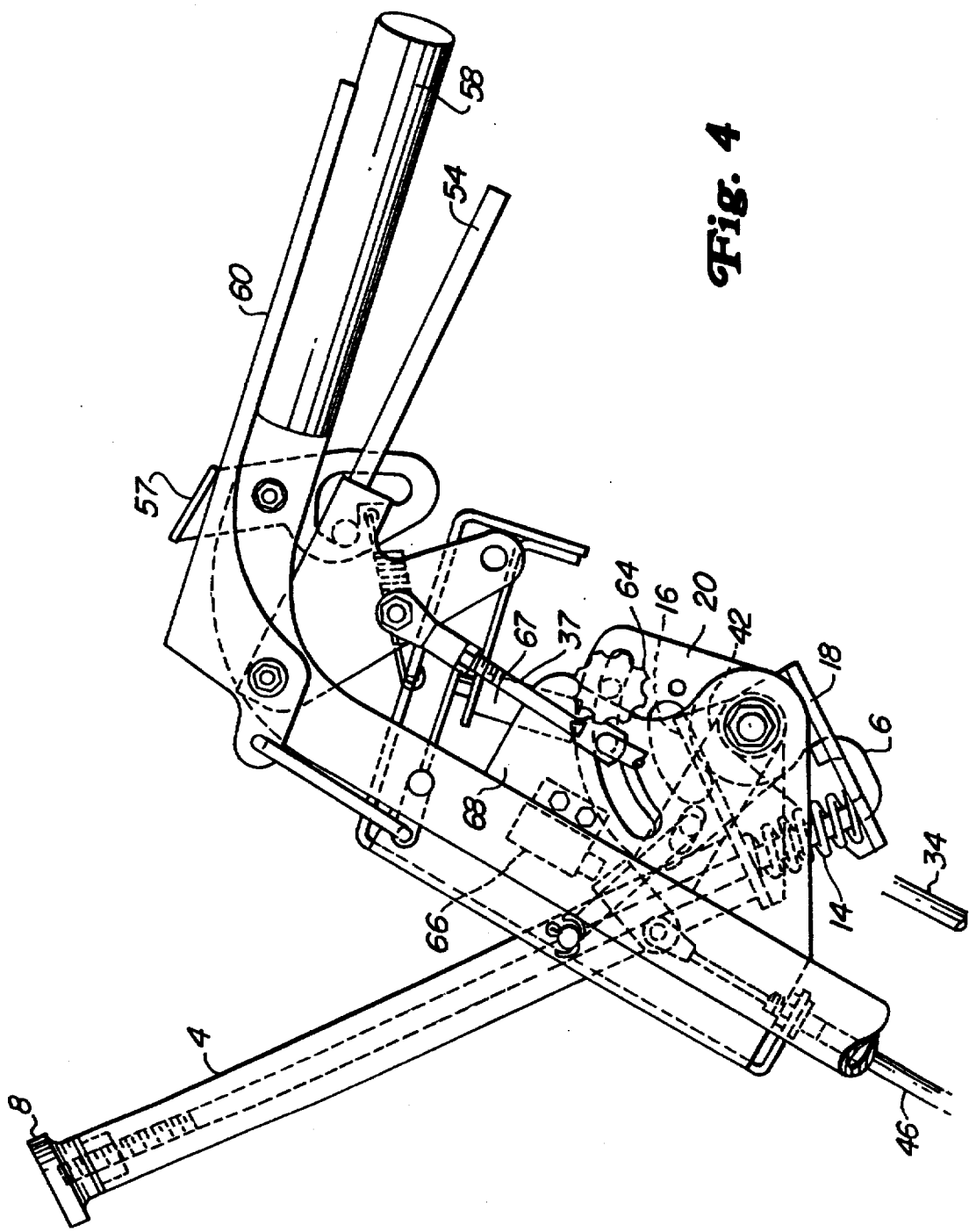
FIG. 4 is a left-hand elevational view of a control mechanism according to the present invention with a main speed control lever in its full-ahead position.

Referring now to FIG. 1, there is shown a simplified perspective view of a self propelled, walk-behind lawn mower according to a preferred embodiment of the present invention. The lawn mower generally includes left and right drive wheels 48, 50, a pair of front wheels 51, an internal combustion engine 52 mounted on a power deck 53 which accommodates a pair of hydrostatic transmissions, a second deck 71 which houses one or more blades, and an instrument console 69 which extends between rearwardly projecting handlebars 58.

As shown in FIG. 2, a wheel motor control mechanism 2 consists of a main speed control lever 4 formed as a hollow cylinder through which a threaded j-bolt 6 is inserted for engagement at its threaded end with a tracking adjustment knob 8. The main speed control lever 4 is welded to a left control tube 10, and is operably connected to a right control tube 12 via the rearwardly extending base of the j-bolt 6 and a control tube biasing spring 14. The left and right control tubes 10, 12 have left and right control tube adjustment plates 16, 18 secured to their inner ends, and terminate at left and right control rod guides 20, 22 at their outer ends. A pivot rod 24 extends through the left and right control tubes 10, 12 along an axis of rotation of the left and right control tubes 10, 12. Unintended rotational movement of the left and right control tubes 10, 12 is discouraged by friction washers 26, one of which is sandwiched between an instrument console support 68 and the left control rod guide 20 and the other of which is sandwiched between the instrument console support 68 and the right control rod guide 22. A pivot rod spring 28 aids in compression of the friction washers 26.

The left and right control tube adjustment plates 16, 18 are generally flat surfaces which are biased apart by the control tube biasing spring 14. Tightening or loosening of the tracking adjustment knob 8 effects rotation of the right control tube 12 with respect to the left control tube 10 and increases or decreases the speed of the right drive wheel 50 with respect to the left drive wheel 48 (Although the particular device illustrated comprises left and right drive wheels 48, 50, it is to be noted that the invention contemplates not only the use of drive wheels, but also other ground engaging traction devices, such as tracks).

Figure 5:
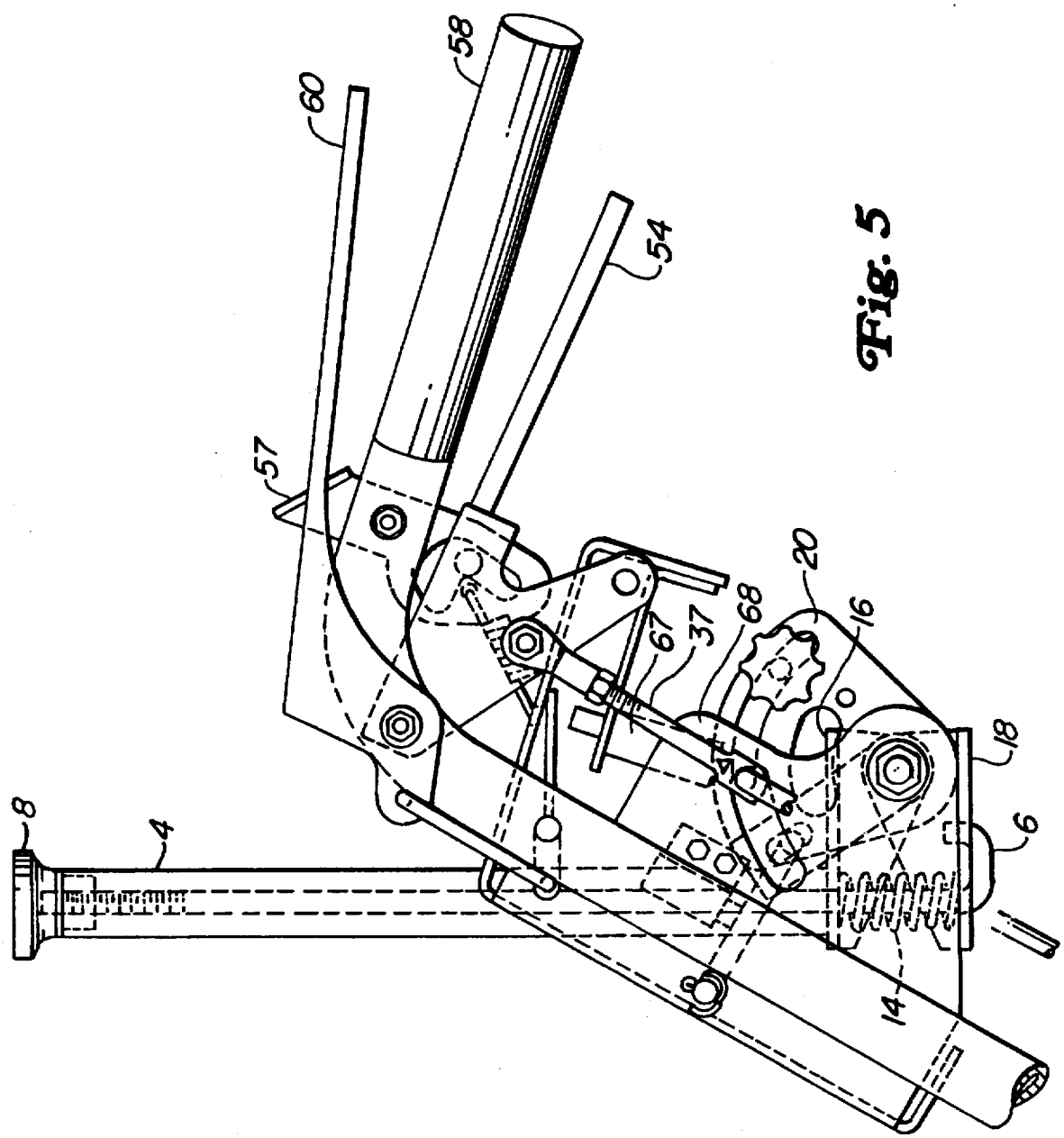
FIG. 5 is a left-hand elevational view of the control mechanism shown in FIG. 4 with the main speed control lever in its stop position.

When the main speed control lever 4 is manipulated by an operator, the left and right control tubes 10, 12 change the range of movement of corresponding left and right control rods 34, 36. The left and right control rods 34, 35 are utilized to influence left and right swashplate adjustment assemblies 38, 40 (shown in FIGS. 6, 7) to change the displacement of corresponding hydraulic pumps within the transmissions. Displacement of the hydraulic pumps relates directly to output of corresponding hydraulic motors which vary the speed of the left and right drive wheels 48, 50 from a top speed when the main speed control lever 4 is pushed forward into its full-ahead position to an approximately neutral position when the main speed control lever 4 is pulled back into its stop position (as shown in FIG. 5). Referring now to FIG. 8, as the main speed control lever 4 is moved to its stop position, a brake arm 42 welded to the left control tube 10 lifts a brake rod assembly 44, rotatably mounted to the instrument console support 68 such that the brake rod assembly 44 rotates about a generally-horizontal axis. The brake rod assembly 44 pulls a brake cable 46 to actuate a brake engagement assembly 47. In the preferred embodiment shown, the brakes activated by the brake engagement assembly 47 are a pair of wet brakes 72 of known design within the hydrostatic transmissions, as shown schematically in FIG. 9, which are used to stop rotation of the left and right drive wheels 48, 50. Although the brakes 72 utilized in the preferred embodiment of the present invention are internal wet disk brakes, use of other types of brakes known in the art (e.g., external, shoe, disk, block, band, and cone brakes) is contemplated by the invention.

Figure 9:
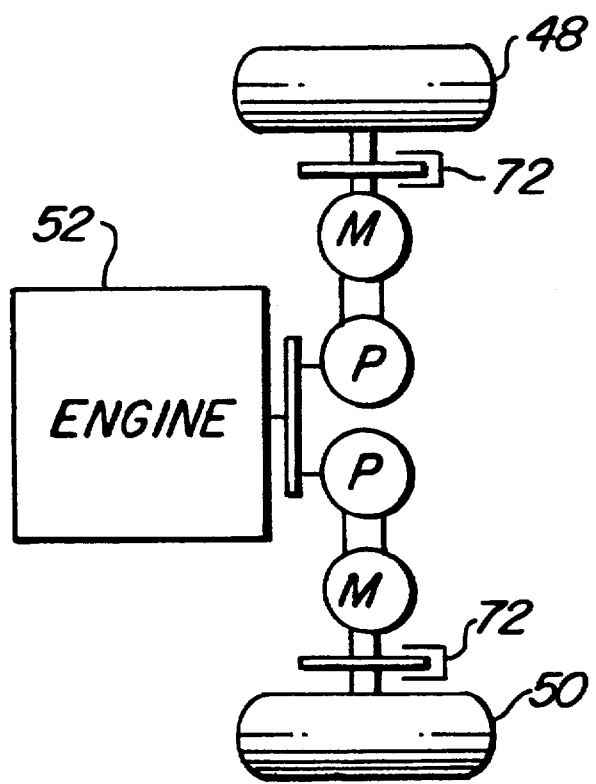
FIG. 9 is a schematic diagram of the mower drive system in a preferred embodiment of the present invention.

During normal mowing operations, power is transmitted from an engine 52 to the left and right drive wheels 48, 50 by a pair of hydrostatic transmissions which are mounted under the power deck 53. As shown in FIG. 9 in schematic form, each hydrostatic transmission comprises a system of hydraulic components including a hydraulic pump and a hydraulic motor. The engine 52 drives the pair of hydraulic pumps, each of which is coupled to one of the hydraulic motors for driving a corresponding one of the drive wheels 48, 50. The brakes are connected to each of the left and right drive wheels 48, 50. The engine 52 also drives a power transfer shaft (not shown) to which one or more blades are coupled for cutting vegetation.

Figure 6:
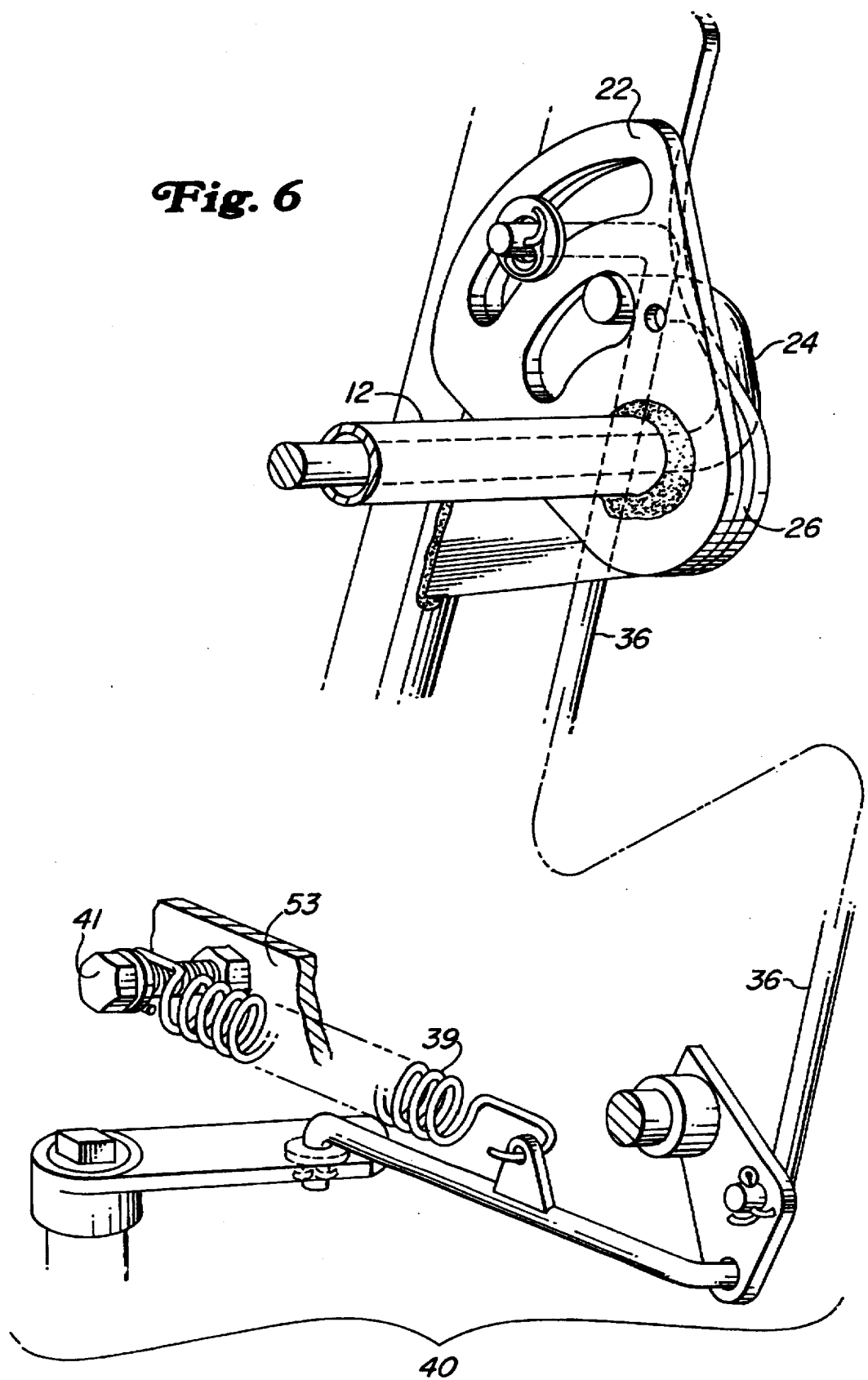
FIG. 6 is a perspective view of a right-hand portion of a control mechanism according to the present invention.

Left and right steering levers 54, 56 are provided on handlebars 58. The left and right steering levers 54, 56 are biased toward a downward position (shown in FIG. 1) due to the swashplate biasing springs 39 which are connected at one end to the left or right swashplate adjustment assembly 38, 40 and at another end to spring retainer means 41 mounted to the power deck 53 as seen in FIGS. 6, 7. The left and right steering levers 54, 56 act on connecting links 37 which move corresponding left and right control rods 34, 36 along a path dictated by the left and right control rod guides 20, 22 to control the hydraulic pumps in an infinite number of increments in a range from the maximum forward speed set by the main speed control lever 4 through neutral to reverse. When the left and right steering levers 54, 56 are in their downward biased position, the left and right drive wheels 48, 50 are propelled in a generally clockwise direction as viewed in FIG. 1 at a rate corresponding to the maximum forward speed set by the main speed control lever 4.

As the left and right steering levers 54, 56 are forced upward toward a neutral position (shown in FIG. 5) by the operator, the corresponding left and right drive wheels 48, 50 are slowed. A manually engageable neutral latch 57 is provided as a control to allow the operator to lock the pair of hydraulic pumps in an approximately neutral position, even where the main speed control lever 4 is in a position other than its stop position. Upward movement of the left or right steering lever 54, 56 beyond the neutral position shifts a corresponding one of the pair of hydraulic pumps into reverse, causing a corresponding one of the left and right drive wheel 48, 50 to rotate opposite its direction of forward rotation.

Movement of the left steering lever 54, or the right steering lever 56 individually with respect to the other represents a left turn or a right turn of the vehicle. In contrast, movement of the main speed control lever 4 or of both left and right steering levers 54, 56 at the same rate effects similar movement of both left and right control rods 34, 36 together and represents straight-line acceleration or deceleration. However, the main speed control lever 4 is preferably configured such that the operator is unable to shift the pair of hydraulic pumps into reverse by using the main speed control lever 4, and manipulation of the left and right steering levers 54, 56 is necessary to drive the mower in reverse. In the preferred embodiment movement of the main speed control lever 4 is limited at its stop position by the top of a lever slot 72 in the instrument console 69. Although some overtravel of the main speed control lever 4 may occur, the full ahead position of the main speed control lever 4 is reached when a swashplate in one of the transmissions to which the main speed control lever 4 is coupled reaches a maximum angle. The full-ahead position of the main speed control lever 4 may be governed by a stop, if so desired.

Other features incorporated into the preferred embodiment include left and right operator presence indicator levers 60, 62, which are located on the handlebars 58 opposite the left and right steering levers 54, 56 so that they may be conveniently engaged by the operator during operation of the vehicle. In addition, an interlock circuit is provided which is comprised of a brake interlock switch 66 (shown in FIGS. 7, 8) activated by placement of the main speed control lever 4 in its stop position, and an operator presence interlock switch 67 (shown in FIGS. 4, 5) activated by engagement of one of the left and right operator presence indicator levers 60, 62. The interlock circuit allows the operator to stop the mower by placing the main speed control lever 4 in its stop position (thereby placing the transmissions in neutral and engaging the brake) and, after disengaging the blade or blades, to release the left and right operator presence indicator levers 60, 62 and step away from the mower while the engine 52 is running. The interlock circuit thereby allows an operator, for example, to stop the mower and walk around it to remove an obstacle from the path of the mower, while ensuring that the engine 52 will not run while the blade or blades are engaged and neither of the left and right operator presence indicator levers 60, 62 are employed.

Also included in the preferred embodiment is an adjustable speed control stop 64 which is removably secured by fastening means 65 to one of the left and right control rod guides 20, 22 to restrict movement of the one of the control rod guides 20, 22 (and therefore movement of the left and right control rods 34, 36 due to manipulation of main speed control lever 4) by abutting the instrument console support 68 and preventing further movement of the left and right control rod guides 20, 22 when the left or right control rod guide 20 or 22, to which the adjustable speed control stop 64 is secured, reaches a desired setting. The adjustable speed control stop 64 may be set in a variety of positions, allowing the operator to preset a preferred speed of operation to which he may easily return after stopping, or to lock the main speed control lever 4 in its stop position to insure against unintended disengagement of the wet brakes. Setting the adjustable speed control stop 64 to lock the main speed control lever 4 in its stop position is especially useful to prevent disengagement of the brakes during transport as the mower may be jostled while being moved on a trailer or other means of conveyance.

We claim:

1. A self-propelled, walk-behind vehicle having a frame and first and second ground engaging traction devices, said self-propelled vehicle comprising:

an engine mounted to the frame;

a transmission operably connected to the engine for converting output of the engine into rotational movement of at least one of the first and second ground engaging traction devices, said transmission having a neutral position;

a main speed control lever operably coupled to the transmission for setting the maximum forward speed of the vehicle, said main speed control lever having a plurality of positions between and including a stop position for placing the transmission in neutral and stopping the vehicle, and a full-ahead position; and a brake operably connected to the first and second ground engaging traction devices, and a brake actuator responsive to positioning of the main speed control lever in its stop position for engaging said brake to prevent movement of the first and second ground engaging traction devices when the main speed control lever is in its stop position.

2. The vehicle of claim 1 additionally comprising an adjustable speed control stop operably connected to the main speed control lever for providing a stop at a desired maximum forward speed.

3. The vehicle of claim 1 additionally comprising an operator presence indicator operably connected to the engine.

4. The vehicle of claim 3 additionally comprising an interlock switch for stopping the engine of the vehicle, said interlock switch responsive to manipulation of the operator presence indicator.

5. A self-propelled, walk-behind vehicle having a frame and first and second ground engaging traction devices, said self-propelled vehicle comprising:

an engine mounted to the frame;

a first hydrostatic transmission operably connected to the engine for converting output of the engine into rotational movement of the first ground engaging traction device, said first hydrostatic transmission having a neutral position;

a second hydrostatic transmission operably connected to the engine for converting output of the engine into rotational movement of the second ground engaging traction device, said second hydrostatic transmission having a neutral position;

first and second steering controls operably connected to the first and second hydrostatic transmissions for individually varying speed attained by the first and second ground engaging traction devices in a range from a maximum forward speed to neutral;

a main speed control lever operably coupled to the first and second hydrostatic transmissions for setting the maximum forward speed of the vehicle, said main speed control lever having a plurality of positions between and including a stop position for placing the first and second hydrostatic transmissions in neutral and stopping the vehicle and a full-ahead position; and a brake operably connected to the first and second ground engaging traction devices, and a brake actuator responsive to positioning of the main speed control lever in its stop position for engaging said brake to prevent movement of the first and second ground engaging traction devices when the main speed control lever is in its stop position.

6. The vehicle of claim 5 wherein the first and second ground engaging traction devices are left and right drive wheels.

7. The vehicle of claim 5 wherein each of the first and second hydrostatic transmissions comprises a hydraulic pump and a hydraulic motor.

8. The vehicle of claim 7 where in the hydraulic pump is a variable displacement hydraulic pump and the hydraulic motor is a fixed displacement hydraulic motor.

9. The vehicle of claim 7 wherein the main speed control lever is operably coupled to the hydraulic pump of each of the first and second hydrostatic transmissions.

10. The vehicle of claim 5 wherein said first and second steering controls are operably connected to the first and second hydrostatic transmissions for individually varying speed attained by the first and second ground engaging traction devices in a range from a maximum forward speed through neutral to reverse.

11. The vehicle of claim 5 additionally comprising an adjustable speed control stop operably connected to the main speed control lever for providing a stop at a desired maximum forward speed.

12. The vehicle of claim 5 additionally comprising an operator presence indicator operably connected to the engine.

13. The vehicle of claim 12 additionally comprising an interlock switch for stopping the engine of the vehicle, said interlock switch responsive to manipulation of the operator presence indicator.

14. A walk-behind lawn mower having a frame and first and second drive wheels, said lawn mower comprising:

an engine mounted to the frame;

a blade coupled with the engine for cutting vegetation;

a first hydrostatic transmission operably connected to the engine for converting output of the engine into rotational movement of the first drive wheel, said first hydrostatic transmission having a neutral position;

a second hydrostatic transmission operably connected to the engine for converting output of the engine into rotational movement of the second drive wheel, said second hydrostatic transmission having a neutral position;

first and second steering controls operably connected to the first and second hydrostatic transmissions for individually varying speed attained by the first and second drive wheels in a range from a maximum forward speed to neutral;

a main speed control lever operably coupled to the first and second hydrostatic transmissions for setting the maximum forward speed of the mower, said main speed control lever having a plurality of positions between and including a stop position for placing the first and second hydrostatic transmissions in neutral and stopping the vehicle and a full-ahead position; and a brake operably connected to the first and second ground engaging traction devices, and a brake actuator responsive to positioning of the main speed control lever in its stop position for engaging said brake to prevent movement of the first and second drive wheels when the main speed control lever is in its stop position.

15. The walk-behind lawn mower of claim 14 wherein each of the first and second hydrostatic transmissions comprises a variable displacement hydraulic pump and a fixed displacement hydraulic motor.

16. The walk-behind lawn mower of claim 14 wherein said first and second steering controls are operably connected to the first and second hydrostatic transmissions for individually varying speed attained by the first and second drive wheels in a range from a maximum forward speed through neutral to reverse.

17. The walk-behind lawn mower of claim 14 wherein said brake actuator responsive to positioning of the main speed control lever in its stop position for engaging said brake to prevent movement of the first and second drive wheels comprises a brake cable operably connected to the main speed control lever and the first and second drive wheels.

18. The walk-behind lawn mower of claim 14 wherein the brake comprises a pair of internal wet disk brakes operably connected to the first and second drive wheels.

19. The walk-behind lawn mower of claim 14 additionally comprising friction means operably connected to the main speed control lever for preventing unintended movement of said main speed control lever.

20. The walk-behind lawn mower of claim 14 additionally comprising an adjustable speed control stop operably connected to the main speed control lever for providing a stop at a desired maximum forward speed.

* * * * *